United States Patent [19]

Soref et al.

[11] 4,011,543
[45] Mar. 8, 1977

[54] LOW CROSSTALK OPTICAL SWITCH

[75] Inventors: Richard A. Soref, Newton Centre; Lloyd R. Schissler, Jamaica Plain, both of Mass.

[73] Assignee: Sperry Rand Corporation, New York, N.Y.

[22] Filed: Feb. 20, 1976

[21] Appl. No.: 660,196

[52] U.S. Cl. .................. 340/166 R; 250/199; 350/96 WG; 350/161 W
[51] Int. Cl.² .............. G02B 5/14; G02F 1/00; H04B 9/00; H04Q 1/00
[58] Field of Search ............ 250/551, 553, 199; 340/166 R, 166 EL; 350/160 R, 161, 162, 150, 96 WG; 179/18 GF; 333/7 R, 7 D

[56] References Cited
UNITED STATES PATENTS

| | | | |
|---|---|---|---|
| 3,622,792 | 11/1971 | Piccininni | 250/199 |
| 3,746,879 | 7/1973 | Esaki et al. | 250/199 X |
| 3,818,451 | 6/1974 | Coleman | 340/166 EL |
| 3,833,866 | 9/1974 | Boutelant | 340/166 R X |
| 3,871,743 | 3/1975 | Fulenwider | 350/161 X |
| 3,916,182 | 10/1975 | Dabby et al. | 250/199 |
| 3,924,931 | 12/1975 | Cheo | 350/161 X |

*Primary Examiner*—Donald J. Yusko
*Attorney, Agent, or Firm*—Howard P. Terry; Seymour Levine

[57] ABSTRACT

A low crosstalk optical switching matrix of individual optical switches wherein anyone of n input ports may be addressed to any one of n output ports. Ports of the individual optical switches which are employed for inter-row and inter-column coupling at the interior of the matrix are not used in the last row and column and are terminated with optical signal absorbers thereat, thus providing a means for absorbing non-addressed signals and spurious reflections. The crosstalk properties of the matrix are further improved by utilizing a multiplicity of four port switching elements in tandem for each individual optical switch.

15 Claims, 6 Drawing Figures

… …

LOW CROSSTALK OPTICAL SWITCH

The invention herein described was made in the course of or under a contract or subcontract thereunder with the Air Force Rome Air Development Center.

BACKGROUND OF THE INVENTION

1. Field of the Invention

The present invention relates to optical switching devices and more particularly to optical switching devices that exhibit low crosstalk characteristics between switchable channels.

2. Description of the Prior Art

Advances in the optical communications art have generated a need for devices that are capable of switching optical signals from one signal channel to another. Some of the devices that have been developed that are capable of performing this switching function employ Bragg diffraction from launched surface acoustic waves, Bragg diffraction by dielectric gratings created by voltage controlled fringing electric fields in an optical guide made of electro-optic high resistivity solid state material, and optical directional couplers wherein coupling from one optical channel to the other is electrically controlled. Each of these are four port devices wherein beam direction or optical waveguide coupling is altered upon the application of an external electrical control signal, and may be employed as switches per se or as elemental switches in a permutation array which couples a signal at one of n input ports to one of n output ports.

Permutation arrays of the prior art focus the attention to the elimination of waveguide crossovers and to the minimization of the number of element switches required to effect the coupling of the n input ports to the n output ports thus providing an array that is relatively easy to fabricate and wherein each port of each element switch is utilized. In these arrays, a crosstalk (leakage) signal from each elemental switch is transported through the array arriving at the output ports as an intefering signal with the desired signal thereat. To hold the inter-channel crosstalk to tolerable levels, generally requires that the elemental switches be fabricated to tolerances that may not be achievable or are too costly.

The present invention discloses an optical switch that is relatively inexpensive to fabricate and when utilized in a switching array significantly reduces the output crosstalk relative to that of the prior art permutation arrays.

SUMMARY OF THE INVENTION

The present invention discloses an optical array wherein any one of n input ports may be addressed to any one of n output ports in a manner that exhibits relatively low crosstalk at an addressed port from other addressed and non-addressed input ports. This is achieved in one embodiment of the invention by employing a four-port optical switch at each of the $n^2$ crossing ports of the array and terminating all non-utilized ports with strongly absorbing optical media to eliminate spurious reflections, absorb non-addressed signals, and absorb leakage from addressed switches. In another embodiment of the invention, greater crosstalk reduction is achieved over that of the previously discussed embodiment by employing two or more coupled four-port optical switches to operate as addressing switches at the array cross points.

DESCRIPTION OF THE PREFERRED EMBODIMENTS

Figure 1:
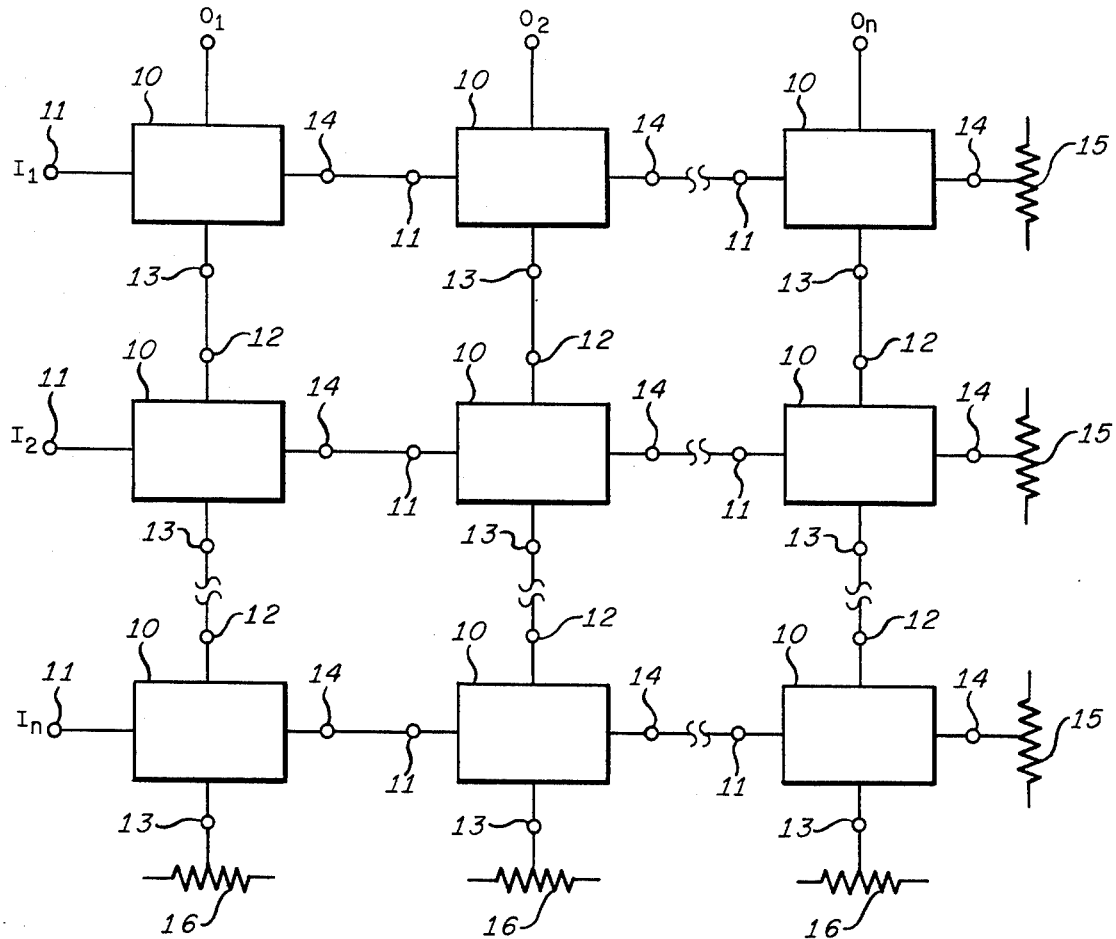
FIG. 1 is a diagram of a low crosstalk addressable optical array employing four-port switches at the array cross points.
Figures 2A, 2B:
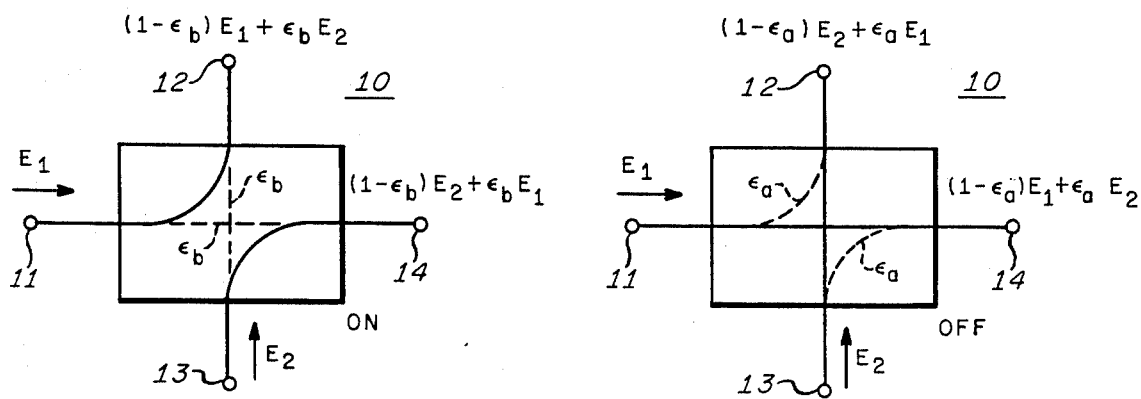
FIGS. 2A and 2B are diagrams employed to explain the interport coupling of four-port optical switches.

An optical array for addressing one of n input ports to one of n output ports may comprise $n^2$ interconnected four-port optical switches as shown in FIG. 1. Each of the four-port optical switches 10 possess only two operating states, an ON state which exists when a predetermined external control signal is applied and an OFF state which exists in the absence thereof. In the ON state shown in FIG. 2A, the switch 10 couples an optical signal $E_1$ incident to the input port 11 to the output port 12 and an otpical signal $E_2$ incident to the input port 13 to the output port 14. Generally this is accomplished with a small fraction of the signal $\epsilon_b$ cross coupled from port 11 to port 14 and from port 13 to port 12 resulting in a total signal $(1 - \epsilon_b) E_1 + \epsilon_b E_2$ and $(1 - \epsilon_b) E_2 + \epsilon_b E_1$ at ports 12 and 14, respectively. In the OFF state shown in FIG. 2B, optical signals at the input ports 11 and 13 feedd through the switch 10 to output ports 14 and 12, respectively. Similar cross coupling exists in the OFF state though the fraction of cross coupled signals $\epsilon_a$ may differ from the fraction of cross coupled signal $\epsilon_b$ of the OFF state, resulting in the total signals $(1 - \epsilon_a) E_2 + \epsilon_a E_1$ and $(1 - \epsilon_a) E_1 + \epsilon_a E_2$ at ports 12 and 14, respectively.

Referring again to FIG. 1, wherein a square matrix array 20 for addressing one of n input ports 11 to one of n output ports 12 is shown. This array 20 is composed of n rows and n columns with an optical reversing switch 10 located at each point at which a row crosses a column when used in this manner. The switch 10 is called "simple cross point". In the explanation to follow, it should be recognized that the columns are numbered from left to right and the rows are numbered from top to bottom. Each optical switch 10 in a column has its output port 14 coupled to the input port 11 of the optical switch in the succeeding column, with the input ports 11 of the switches 10 in the first column serving as input ports to the array 20 and the output ports 14 of the switches 10 in the last column coupled to optical signal absorbing media or terminations 15. Also, each optical switch 10 in the row has its output port 12 coupled to the input port 13 of the switch 10 in the preceding row, with the input ports 13 of the last row coupled to an optical termination 16 and the output ports 12 of the switches 10 in the first row serving as output ports for the array 20. The switches 10 each operate as three port single pole-double throw switches, switchably coupling the input port 11 to the output ports 12 and 14. Input ports 13 of the internal array switches which are not terminated are utilized, in their OFF state, to pass optical signals from an addressed ON state switch to an array output port 12, while the termination at the unused input ports 13 of the last row and the unused output ports 14 of the last column serve to eliminate spurious reflections, to absorb ON state leakage, and to absorb non-addressed input signals. Addressing is accomplished in the switching matrix shown in FIG. 1 by having only one cross point switch in the ON state in any row or column, thus eliminating the possibility of conference calls.

As previously stated, the switches 10 couple a fraction of the input signal to the non-coupled port, $\epsilon_a$ being the fraction of cross coupling in the OFF state and $\epsilon_b$ being the fraction of cross coupling during the ON state. When switches for which tradeoffs between $\epsilon_a$ and $\epsilon_b$ are required to achieve minimum cross coupling are utilized in the array, the tradeoffs are selected to provide $\epsilon_a \ll \epsilon_b$ thus providing the minimum possible cross coupled optical signals at the array output ports 12. In the terminated matrix shown in FIG. 1, $\epsilon_b$ of the cross point switches 10 may be relatively large, possibly as large as 0.5, without seriously hampering the optical matrix performance since fractional through port losses as large as 50% are not considered as serious optical losses. Inasmuch as $\epsilon_a \ll \epsilon_b$ and only one cross point switch per row and one per column is turned ON to achieve the desired one-to-one mapping of inputs onto outputs, optical signals pass through only one ON state cross point and only that $\epsilon_b$ fractional loss is encountered. The switches 10 that may be employed in the array may be selected from a number of well known switchable four-port optical devices providing either electrooptic or acousto-optic control. These devices include directional coupler switches with 2-$d$ mode confinement and switchable Bragg diffraction gratings with 1-$d$ confinement. In FIGS. 1-4, the signal coupling paths between the switches 10 may be optical waveguides which confine and route the optical beams. These waveguides and the cross point switches 10 may be constructed utilizing state-of-the-art techniques such as thin-film single-mode devices or thick-film multimode devices.

Figure 3A:
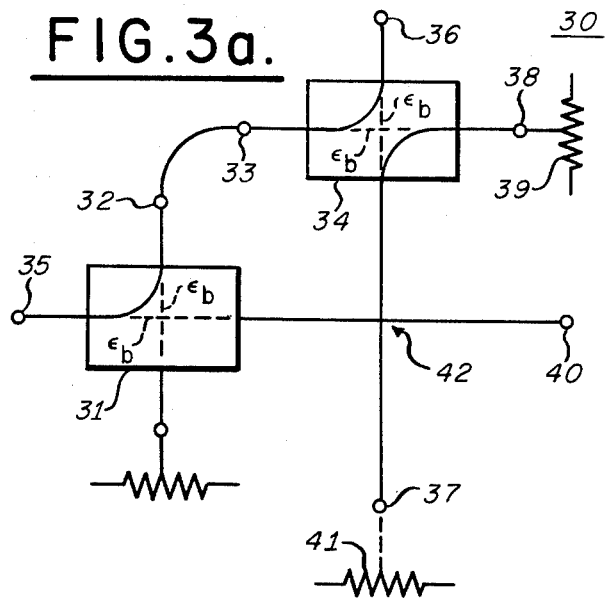
FIGS. 3A and 3B are diagrams of the coupling of two optical switches to achieve low crosstalk between switchable ports.
Figure 3B:
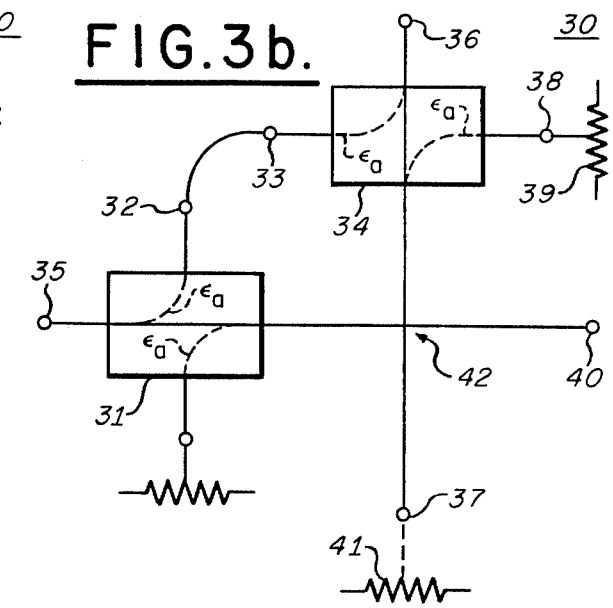

The crosstalk characteristics of the array 20 may be significantly improved by providing a compound optical switch 30 made from two or more individual four-port optical switches as shown in FIG. 3A and FIG. 3B. Each compound switch 30 includes a four-port optical switch 31 with one output port 32 coupled to an input port 33 of a second optical switch 34. There is a waveguide crossover 42. Referring to FIG. 3A, wherein the optical signal routing between ports is shown for the simultaneous operation of switches 31 and 34 in the ON mode, which is the ON state of compound optical switch 30. An optical signal incident to a first input port 35 of compound optical switch 30, is coupled by optical switch 31 to port 32 from which it is coupled to port 33 of optical switch 34 which in turn couples the optical signal to a output port 36. An optical signal incident to a second input port 37 of compound optical switch 30, is coupled by switch 34 to a second output port 38, which is terminated by an optical signal absorber 39. A small fraction $\epsilon_b$ of the optical signal at input terminal 35 is cross coupled to output terminal 40 of composite switch 30 while a small fraction $\epsilon_b$ of an optical signal at input terminal 37 is cross coupled to the compound output terminal 36. In this state, compound switch 30 provides a desired signal-to-cross coupled signal ratio that is equal to $(1 - \epsilon_b)^2/\epsilon_b$. In the OFF state shown in FIG. 3B, a signal incident to input port 35 of the compound switch 30 is coupled to output port 40 via the four-port optical switch 31 and a signal incident to input port 37 is coupled to output port 36 via the four-port optical switch 34. In this state, the desired optical signal to crosstalk signal ratio at output port 36 is given by $(1 - \epsilon_a)/\epsilon_a^2$. Three port single pole-double throw switch operation can be attained from the configuration shown in FIG. 3A and FIG. 3B by providing an optical termination 41 at input terminal 37, thus a single input exists which is switchably coupled between output ports 36 and 40. If more than two, four-port optical switches are included in each composite, an additional improvement in the desired signal-to-crosstalk ratio may be realized. For example, when a third four-port optical switch is coupled to output port 36 in the same manner as the coupling between optical switches 31 and 34 with terminal 37 coupled to an optical signal-absorbing termination and the corresponding port of the third switch serving as the second input port to which a signal is incident, the desired signal to crosstalk ratio becomes $(1 - \epsilon_a)/\epsilon_a^3$.

Figure 4:
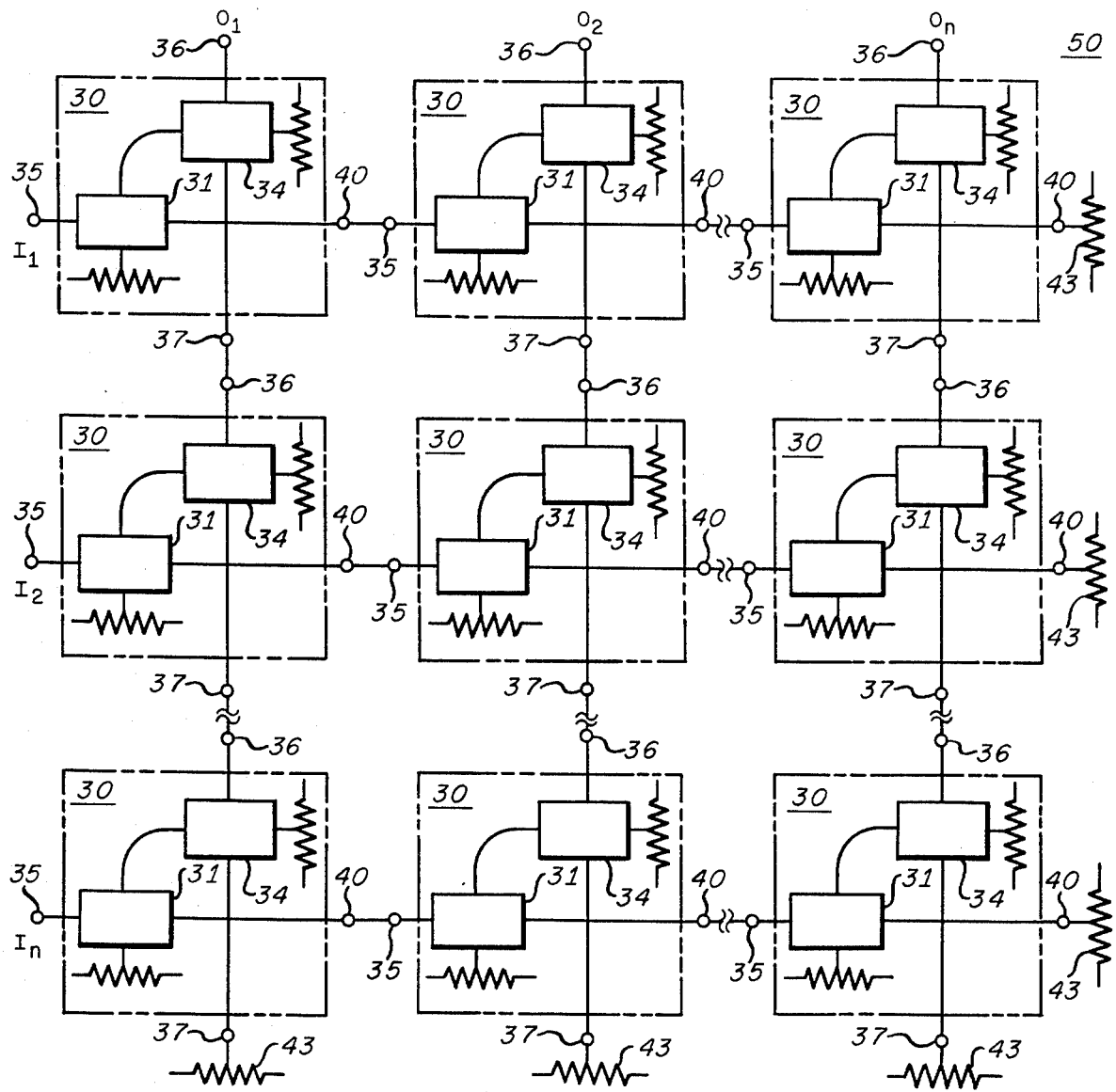
FIG. 4 is a diagram of a low crosstalk addressable optical array employing two optical switches in tandem as the switching elements at the cross points of the array.

The composite switch of FIGS. 3A and 3B may be utilized in a switching matrix consisting of n rows and n columns providing $n^2$ compound cross points as shown in FIG. 4. In FIG. 4, the output port 40 of the composite switches in a given column are coupled to the input ports 35 of the composite switches in the succeeding column and the input ports 37 of the composite switches in a given row are coupled to the output ports 36 of the composite switches in the succeeding row, while the input ports 35 of the composite switches in the first column serve as the input ports to the permutation array 50, the output ports 36 of the composite switches 30 in the first row serve as the output ports of the permutation array 50 and the input ports 37 and output ports 40 of the composite switches in the last row and column respectively are terminated with optical absorbes 43.

When equal optical signals are put into the input ports $I_1 \ldots I_n$, the output signal to crosstalk ratio will vary from port to port among the n output ports $O_1 \ldots O_n$, with the lowest signal-to-crosstalk ratios appearing at the first column output port $O_1$. Assuming $\epsilon_a \ll 1$ and $\epsilon_a < \epsilon_b$, the worst case signal-to-crosstalk ratio is approximately $$\frac{(1 - \epsilon_b)^2}{(n - 1)\epsilon_a^2}$$

for the n addressing possibilities from the first column input ports to the output port $O_1$. By comparison, the signal-to-crosstalk ratio of an $n \times n$ matrix of simple cross points is approximately $$\frac{1 - \epsilon_b}{(n - 1)\epsilon_a}$$

under the same conditions. Therefore, the FIG. 4 low crosstalk matrix gives a large increase in signal-to-crosstalk by the factor $$\frac{1 - \epsilon_b}{\epsilon_a}$$

which is a significant improvement over the prior art. In addition, the compound cross point techniques of FIGS. 3 and 4 makes optical matrixing feasible in situations where it would otherwise not be feasible, namely the case $n \approx 1/\epsilon_a$ for which the signal-to-crosstalk ratio approaches unity in the prior art.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A low crosstalk optical switch comprising:

first means selectively operable in a first mode and a second mode having an input port and first and second output ports for switchably coupling said input port to said first and second output ports, said input port being coupled to said first output port during operation in said first mode and to said second output port during operation in said second mode; and second means selectively operable in a first mode and a second mode having a first input port coupled to said first output port of said first switching means, a second input port and an output port, for switchably coupling said first and second input ports to said output port, said output port being coupled to said first input port during operation in said first mode and to said second input port during operation in said second mode whereby an optical signal at said input port of said first switching means is coupled to said output port of said second switching means when said first and second switching means are simultaneously operating in said first mode, and an optical signal at said input port of said first switching means is coupled to said second output port of said first switching means and an optical signal at said second input port of said second switching means is coupled to said output of said second switching means when said first and second switching means are simultaneously operating in said second mode.

2. A low crosstalk optical switch in accordance with claim 1 wherein said second switching means further includes a second output port switchably coupled to said second input port during operation in said first mode and to said first input port during operation in said second mode.

3. A low crosstalk optical switch in accordance with claim 2 wherein said second output port of said second switching means is terminated with an optical signal absorber.

4. A low crosstalk optical switch in accordance with claim 3 wherein said first switching means further includes a second input port switchably coupled to said first output port and to said second output port during operation in said second mode and said first mode respectively.

5. A low crosstalk optical switch in accordance with claim 4 wherein said second input port of said first switching means is terminated with an optical signal absorber.

6. A low crosstalk optical switch in accordance with claim 5 further including a termination for absorbing optical signals coupled to said second input port of said second switching means thereby forming a single pole-double throw optical switch.

7. A low crosstalk optical switch in accordance with claim 3 further including a termination for absorbing optical signals coupled to said second input port of said second switching means thereby establishing a single pole - double throw optical switch.

8. A low crosstalk optical switch in accordance with claim 1 further including a termination for absorbing optical signals coupled to said second input port of said second switching means thereby establishing a single pole - double throw optical switch.

9. A low crosstalk optical switch in accordance with claim 1 wherein said second switching means couples said output terminal to said first input port during operation in said second mode and to said second input port during operation in said first mode whereby an optical signal at said input port of said first switching means is coupled to said output port of said second switching means when said first switching means is operating in said first mode and said second switching means is operating in said second mode and an optical signal at said second input port of said second switching means is coupled to said output port of said second switching means when said second switching means is operating in said first mode.

10. A low crosstalk optical switch in accordance with claim 9 further including a termination for absorbing optical signals coupled to said second input port of said second switching means thereby forming a single pole-double throw optical switch.

11. A low crosstalk optical switch in accordance with claim 1 wherein said second output port of said first switching means is coupled to said first input port of said second switching means and said second switching means couples said output port to said first input port during operation in said second mode and to said second input port during operation in said first mode whereby an optical signal at said input port of said first switching means is coupled to said first output port of said first switching means when said first switching means is operating in said first mode and to said output port of said second switching means when said first and second switching means are operating in said second mode and an optical signal at said second input port of said second switching means is coupled to said output port when said second switching means is operating in said first mode.

12. A low crosstalk optical switch in accordance with claim 1 wherein said second output port of said first means is coupled to said first input port of said second switching means whereby an optical signal at said input port of said first switching means is coupled to said first output port when said first switching means is in said first mode and to said output port of said second switching means when said first switching means is in said second mode and said second switching means is in said first mode.

13. An optical switching array having n input ports and n output ports for selectively coupling one of said n input ports to one of said n output ports, such coupling establishing a pair, with from one to n pairs selectably operable simultaneously comprising:

$n^2$ optical switches each including:

first means selectively operable in a first mode and a second mode, having an input port and first and second output ports, for switchably coupling said input port to said first and second output ports, said input port coupled to said first output port in said first mode and to said second output port in said second mode, second means selectively operably in a first mode and a second mode, having a first input port coupled to said first output port of said first switching means, a second input port and an output port, for switchably coupling said first and second input ports to said output port, said output port coupled to said first input port in said first mode and to said second input port in said second mode, whereby an optical signal at said input port of said first switching means is coupled to said output port of said second switching means when said first and second switching means are simultaneously operating in said first mode, and an optical signal at said input port of said first switching means is coupled to said second output port of said first switching means and an optical signal at said second input of said second switching means is coupled to said output port of said second switching means when said first and second switching means are simultaneously operating in said second mode, $n$ columns consisting of said optical switches wherein said second input port of said second switching means of the $j^{th}$ optical switch in the $k^{th}$ column couples to said output port of said second switching means of the $j^{th}-1$ optical switch in said $k^{th}$ column; and $n$ rows of said optical switches wherein said second output port of said first switching means of the $k^{th}$ optical switch in the $j^{th}$ row couples to said input port of said first switching means of the $k^{th}-1$ optical switch in the $j^{th}$ row, said input port of said first switching means of the first optical switch in said $j^{th}$ row serving as the $j^{th}$ input port of said optical switching array, and said second output port of said first switching means of the $n^{th}$ optical switch in said $j^{th}$ row coupled to an optical signal absorbing termination whereby simultaneously operating said first and second switching means of the $j^{th}$ optical switch in the $k^{th}$ column in said first mode while simultaneously operating all of the other optical switches in said optical switching array in said second mode, couples an optical signal at said $j^{th}$ input port to said $k^{th}$ output port.

14. An optical switching array in accordance with claim 13 wherein:

said first switching means further includes a second input port terminated with an optical absorber and switchably coupled to said first and second output ports during operation in said second and first modes, respectively; and said second switching means further includes a second output port terminated with an optical absorber and switchably coupled to said first and second input ports during operation in said second and first modes respectively.

15. An optical switching array having $n$ input ports and n output ports for selectively coupling one of said n input ports to one of said n output ports comprising:

$n^2$ optical switches selectively operable in a first mode and a second mode, having first and second input ports and first and second output ports, for switchably coupling said first input port to said first output port and said second input port to said second output port during operation in said first mode and said first input port to said second output port and said second input port to said first output port during operation in said second mode;

n columns consisting of said n optical switches wherein said second input port of the $j^{th}$ optical switch in the $k^{th}$ column couples to said first output port of the $j^{th}-1$ optical switch in said $k^{th}$ column; and $n$ rows of said optical switches wherein said second output port of the $k^{th}$ optical switch in the $j^{th}$ row couples to said first input port of the $k^{th}+1$ optical switch in the $j^{th}$ row, said first input port of the first optical switch in said $j^{th}$ row serving as the $j^{th}$ input port of said optical switching array, and said second output of said $n^{th}$ optical switch in said $j^{th}$ row coupled to an optical signal absorbing termination whereby operating said optical switch in the $j^{th}$ row and $k^{th}$ column in said first mode while simultaneously operating all of the other optical switches in said optical switching array in said second mode couples an optical signal at said $j^{th}$ input port to said $k^{th}$ output port.

* * * * *